United States Patent
Grzybowski et al.

(10) Patent No.: US 8,679,599 B2
(45) Date of Patent: *Mar. 25, 2014

(54) LIGHT-WEIGHT STRENGTHENED, LOW-EMITTANCE VACUUM INSULATED GLASS (VIG) WINDOWS

(75) Inventors: Richard Robert Grzybowski, Corning, NY (US); Michael S Pambianchi, Corning, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 13/074,599

(22) Filed: Mar. 29, 2011

(65) Prior Publication Data

US 2012/0247063 A1     Oct. 4, 2012

(51) Int. Cl.
*E06B 3/66* (2006.01)
*E06B 3/663* (2006.01)
*E04C 2/54* (2006.01)

(52) U.S. Cl.
USPC ......... 428/34; 428/410; 52/786.1; 52/786.11; 52/786.13

(58) Field of Classification Search
USPC ............ 428/34, 119, 120, 410; 52/786.1, 52/786.11, 786.13
See application file for complete search history.

(56) References Cited

U.S. PATENT DOCUMENTS

| | | | |
|---|---|---|---|
| 1,770,200 A * | 7/1930 | Comstock | 52/576 |
| 4,683,154 A * | 7/1987 | Benson et al. | 428/34 |
| 5,027,574 A | 7/1991 | Phillip | 52/171 |
| 5,379,149 A | 1/1995 | Snitzer et al. | 359/341 |
| 5,794,404 A | 8/1998 | Kim | |
| 5,840,239 A | 11/1998 | Partanen et al. | 264/401 |
| 5,877,103 A | 3/1999 | Dupont et al. | 501/71 |
| 6,291,036 B1 | 9/2001 | Wang et al. | |

(Continued)

FOREIGN PATENT DOCUMENTS

EP   0283971       9/1988
EP   1 077 302 A2  2/2001

(Continued)

OTHER PUBLICATIONS

WO 2010/053943, May 2010.*

(Continued)

*Primary Examiner* — Donald J Loney
(74) *Attorney, Agent, or Firm* — Ryan T. Hardee

(57) ABSTRACT

Vacuum-insulated glass windows include two or more glass panes, and glass-bump spacers formed in a surface of one of the panes. The glass-bump spacers consist of the glass material from the body portion of the glass pane. At least one of the glass panes comprises chemically-strengthened glass. Methods of forming VIG windows include forming the glass-bump spacers by irradiating a glass pane with a focused beam from a laser. Heating effects in the glass cause the glass to locally expand, thereby forming a glass-bump spacer. In embodiments where the glass-bump spacers are formed in a chemically-strengthened glass pane, the glass-bump spacers may be formed before or after the chemical strengthening. A second glass pane is brought into contact with the glass-bump spacers, and the edges sealed. The resulting sealed interior region is evacuated to a pressure of less than one atmosphere.

19 Claims, 12 Drawing Sheets

(56) References Cited

U.S. PATENT DOCUMENTS

| | | | |
|---|---|---|---|
| 6,472,295 B1 | 10/2002 | Morris et al. | 438/463 |
| 2005/0132662 A1 | 6/2005 | Hornung et al. | 52/202 |
| 2007/0201797 A1 | 8/2007 | Grzybowski et al. | 385/52 |
| 2010/0107525 A1* | 5/2010 | Grzybowski et al. | 52/204.591 |

FOREIGN PATENT DOCUMENTS

| | | |
|---|---|---|
| WO | 94/24398 | 10/1994 |
| WO | 99/45225 | 9/1999 |
| WO | 2007/141583 | 12/2007 |
| WO | 2010/053943 | 5/2010 |

OTHER PUBLICATIONS

Chino, "Revolutionary Super-Insulating Vacuum Glass!", http://www.inhabitat.com/2008/03/24/guardian-develops-hyper-insulating-vacuum-glass/, 2008.

Nippon Sheet Glass Spacia, http://www.nsg-spacia.co.jp/tech/index.htm., printed Nov. 5, 2008.

Friedl, "FAQ/Info VIG + ProVIG", http://www.vig-info.de/ProjektProVig/FAQ-Vig.html, updated Oct. 2008.

PCT/US2012/029033 Search Report.

* cited by examiner

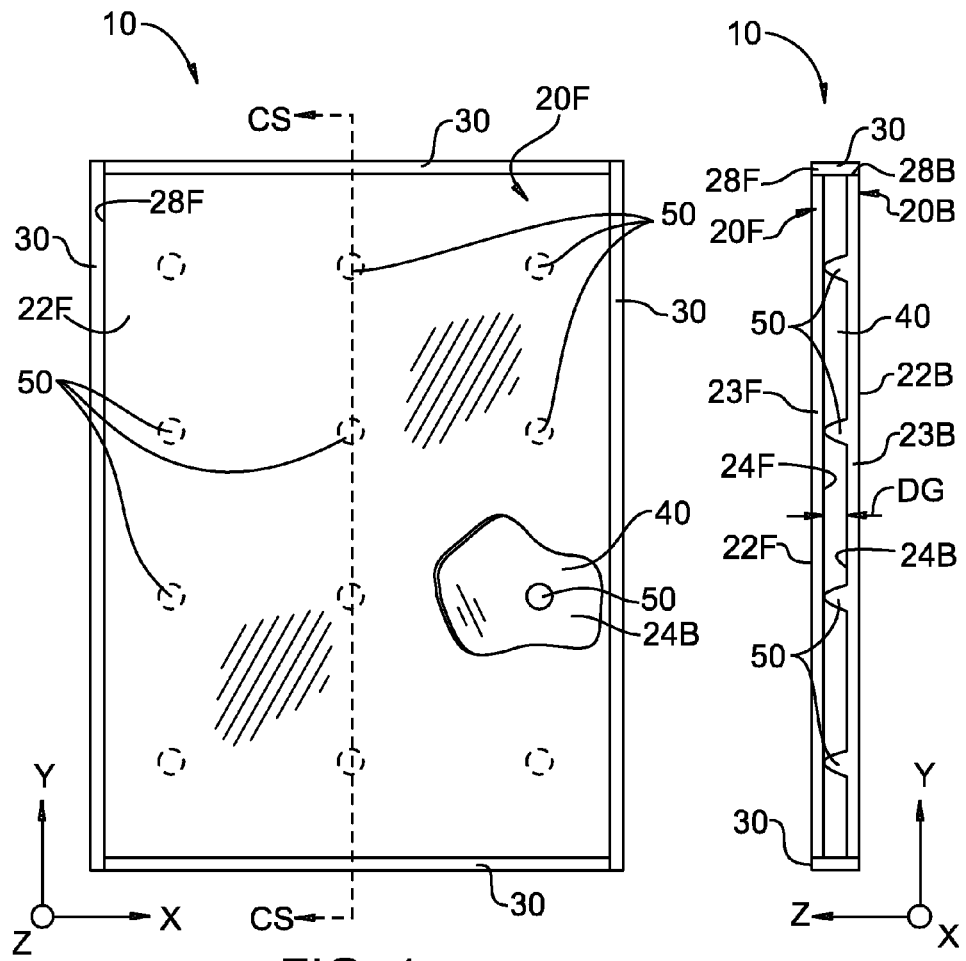
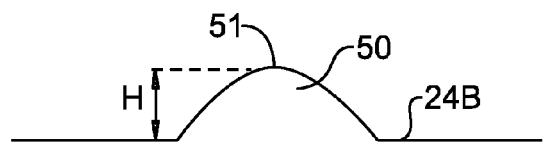

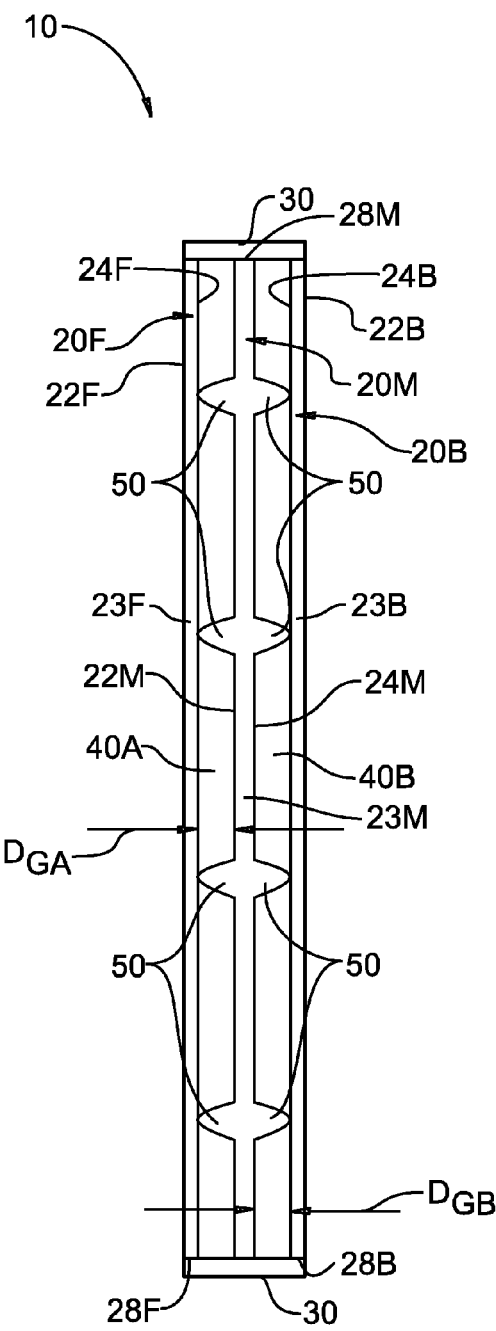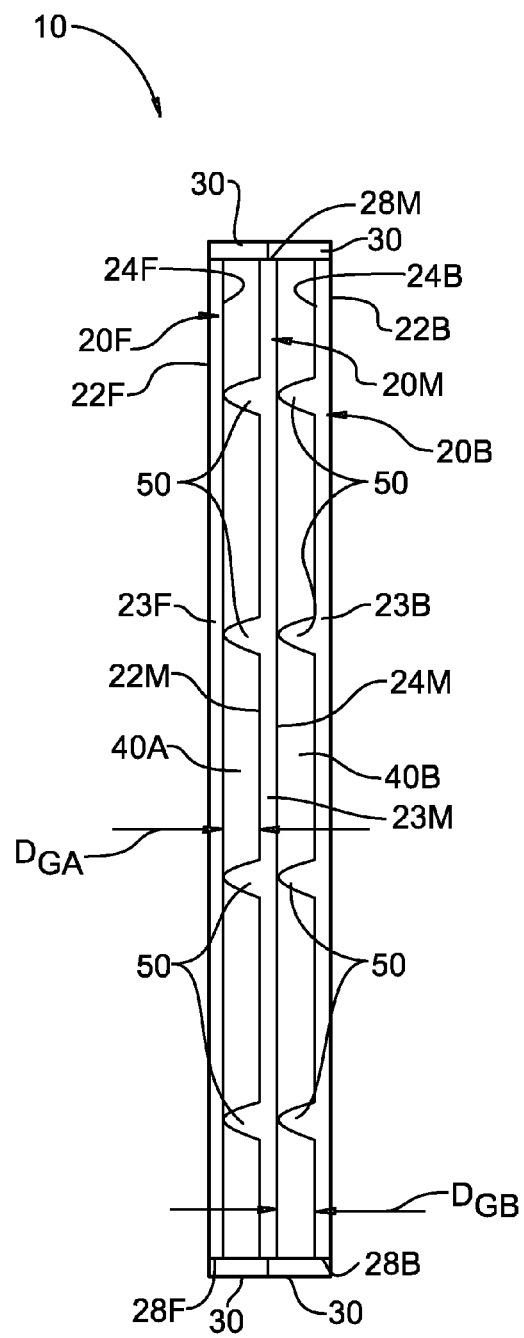
FIG. 4A                    FIG. 4B

LIGHT-WEIGHT STRENGTHENED, LOW-EMITTANCE VACUUM INSULATED GLASS (VIG) WINDOWS

FIELD OF THE INVENTION

The present disclosure relates generally to low-emittance (low-E) vacuum-insulated glass (VIG) windows, and more particularly to vacuum-insulated glass windows that include at least one chemically-strengthened pane of glass and which comprise glass-bump spacers formed in one or more of the glass panes.

BACKGROUND

Vacuum-insulated glass (VIG) windows typically include two or more glass panes with an evacuated space (i.e., vacuum) located between the panes. The overall construction provides improved thermal and noise insulating properties compared to ordinary glass windows. To prevent sagging and contact between adjacent glass panes, discrete spacers can be placed between adjacent glass panes. The spacers can be made of aluminum, plastic, ceramic, or glass and are conventionally distinct from the glass panes, i.e., they are separate, discrete elements disposed and fixed between the glass panes.

While conventional spacers are effective in separating the panes, they tend to be visible when looking through the window, thereby making the window unsightly. Moreover, in vacuum-insulated glass windows that comprise low emissivity coatings, conventional spacers can abrade the low-E coating, particularly when exposed to a thermal gradient where differential thermal expansion between the indoor and out door panes can cause relative movement of the glass panes and the spacers. Abraded or otherwise damaged low-E coatings non-uniformly reflect incident light, which manifests as so-called "starlight emission" which is an undesired optical effect in window glass. In addition, the need to dispose the discrete spacers between the panes and then fix the spacers to the panes adds cost and complexity to the VIG window manufacturing process.

In view of the foregoing, there is a need for economical low-E vacuum-insulated glass windows as well as the attendant methods for making such windows.

SUMMARY

The present disclosure relates to low-emittance VIG windows as well as to methods of forming such windows. According to an embodiment, a vacuum-insulated glass window comprises a first glass pane having a first body formed from a first glass material and having first opposite surfaces and a first outer edge, a second glass pane spaced apart from and disposed substantially parallel to the first glass pane at a first distance and having a second body formed from a second glass material and having second opposite surfaces and a second outer edge, and a first edge seal formed around at least respective portions of the first and second outer edges so as to define a first sealed interior region between the first and second glass panes, wherein the first sealed interior region has a vacuum pressure of less than one atmosphere. A first plurality of glass-bump spacers are integrally formed in one of the first surfaces of the first glass pane and consist of the first glass material from the first body portion. A first optical coating is formed over both the first glass-bump spacers and the first surface in which the first glass-bump spacers are formed. In the assembled window, the plurality of coated glass-bump spacers contact the second glass pane so as to maintain said spaced apart first distance. At least one of the first glass pane and the second glass pane comprises a chemically-strengthened glass material. In further embodiments, the VIG window comprises a third pane.

An example method of forming a VIG window includes providing a first glass pane having a first body portion with a first surface and a first edge and comprising a first glass material, and integrally forming in the first surface a first plurality of glass-bump spacers consisting of the first glass material from the first body portion. A first optical coating is formed over both the first surface and the first plurality of glass-bump spacers. The plurality of coated glass-bump spacers of the first glass pane are brought into contact with a chemically-strengthened second glass pane having a second surface and a second edge so that the first and second glass panes are spaced apart by a first distance between the first and second surfaces. The first and second edges are sealed to define an interior region between the first and second glass panes, and a vacuum pressure of less than one atmosphere is formed in the interior region. In embodiments, the glass-bump spacers can be formed in a first glass pane that is chemically-strengthened. The chemical strengthening is typically done before forming the glass-bump spacers.

Additional aspects, features and advantages are set forth in the detailed description that follows and, in part, will be readily apparent to those skilled in the art from that description or recognized by practicing the invention as described herein, including the detailed description that follows, the claims, as well as the appended drawings.

It is to be understood that both the foregoing general description and the following detailed description and are intended to provide an overview or framework for understanding the nature and character of the invention as it is claimed. The accompanying drawings are included to provide a further understanding and are incorporated in and constitute a part of this specification. The drawings illustrate various embodiments and, together with the description, serve to explain the principles and operations of the invention.

BRIEF DESCRIPTION OF THE DRAWINGS

FIG. 1 is a front-on view of an example two-pane VIG window according to embodiments;

FIG. 2 is a cross-sectional view of the VIG window of FIG. 1 as viewed in the direction CS-CS;

FIG. 3 is a close-up cross-sectional view of an example glass-bump spacer;

FIG. 4A is a cross-sectional view similar to FIG. 2 and that illustrates an example embodiment of a three-pane VIG window having a middle glass pane with glass-bump spacers formed in both surfaces of the middle pane;

FIG. 4B is similar to FIG. 4A, except that the second set of glass-bump spacers are formed in the back glass pane rather than the middle glass pane;

DETAILED DESCRIPTION

Figure 4C:
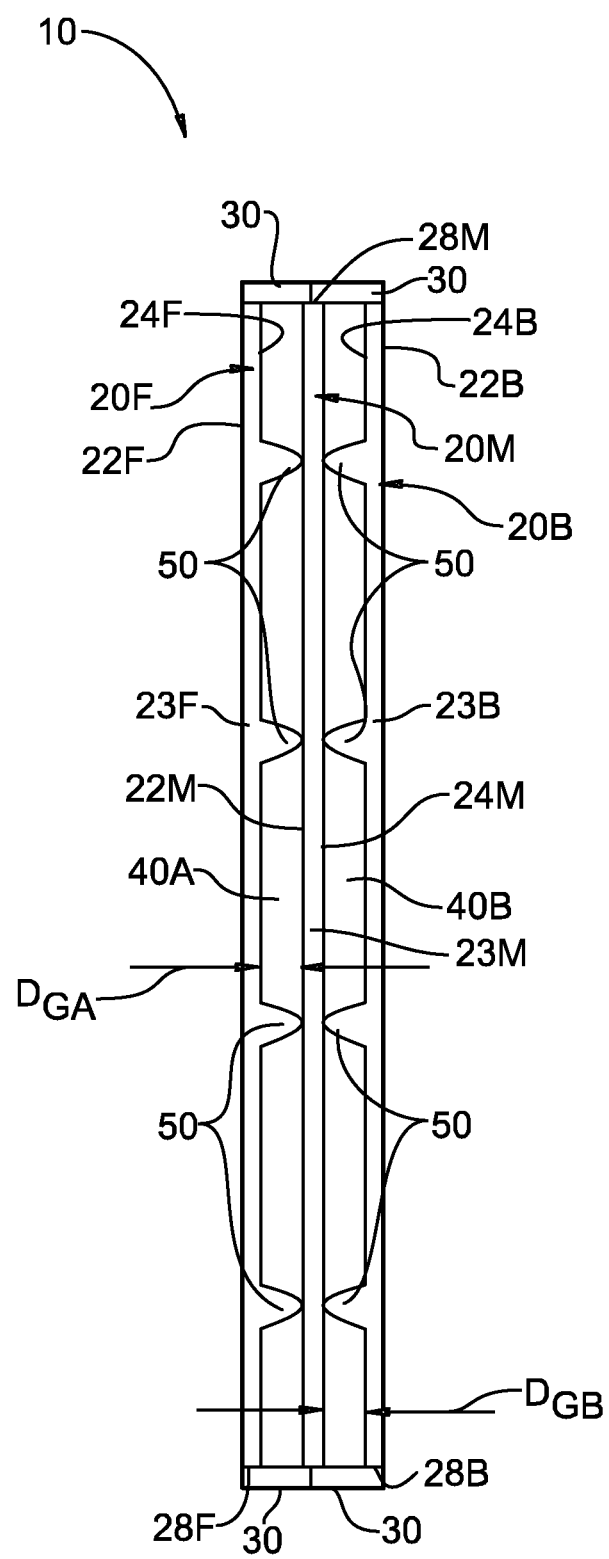
FIG. 4C is similar to FIG. 4A, except that the first and second sets of glass-bump spacers are formed in the front and back glass panes rather than the middle glass pane.

A vacuum-insulated glass (VIG) window comprises a first glass pane, a second glass pane spaced apart from and disposed substantially parallel to the first glass pane at a first distance, a plurality of glass-bump spacers integrally formed in a first surface of the first glass pane, and a first optical coating formed over both the glass-bump spacers and the first surface in which the first glass-bump spacers are formed, wherein at least one of the first glass pane and the second glass pane comprises a chemically-strengthened glass material, and the plurality of coated glass-bump spacers contact the second glass pane so as to maintain said spaced apart first distance. Two or more glass panes may be incorporated into a VIG window that comprises an evacuated region between adjacent glass panes. Aspects of forming glass-bump spacers, chemically-strengthened glass panes and optical coatings such as low-emittance (low-E) coatings are described below.

As disclosed herein, glass-bump spacers are "formed in" a glass pane. "Formed in" means that the glass-bump spacers grow out of the body portion of the glass pane and are formed from the glass material making up the glass pane, so as to outwardly protrude in a convex manner from an otherwise substantially flat glass-pane surface. Glass-bump spacers can be formed in a glass pane via photo-induced absorption.

The term "photo-induced absorption" is broadly understood to mean a local change of the absorption spectrum of a glass pane resulting from locally exposing (irradiating) the glass pane with radiation. Photo-induced absorption may involve a change in absorption at a wavelength or a range of wavelengths, including, but not limited to, ultra-violet, near ultra-violet, visible, near-infrared, and/or infrared wavelengths. Examples of photo-induced absorption in a transparent glass pane include, for example and without limitation, color-center formation, transient glass defect formation, and permanent glass defect formation.

A window as defined herein is an article comprising two or more glass panes that are at least partially transparent to electromagnetic (EM) radiation, including EM radiation having ultra-violet, near ultra-violet, visible, near-infrared, and/or infrared wavelengths.

VIG Windows with Integrally Formed Glass-Bump Spacers

FIG. 1 is a front-on view of an example embodiment of a two-pane VIG window 10. FIG. 2 is a cross-sectional view of the example VIG window 10 of FIG. 1 as viewed in the direction CS-CS. Cartesian coordinates are shown for reference. VIG window 10 includes two glass panes 20, namely a front glass pane 20F and a back glass pane 20B disposed opposite to and substantially parallel to one another. Front glass pane 20F has a body portion 23F made of a first glass material and has outer and inner surfaces 22F and 24F and an outer edge 28F. Likewise, back glass pane 20B has a body portion 23B made of a second glass material and has outer and inner surfaces 22B and 24B and an outer edge 28B. In an example embodiment, the first and second glass materials making up body portions 23F and 23B are the same. In a further example embodiment, either or both of the first and second glass materials making up body portions 23F and 23B can comprise chemically-strengthened glass.

Front and back glass panes 20F and 20B are separated by a distance $D_G$ as measured from their respective inner surfaces 24F and 24B. An edge seal 30 is provided at respective outer edges 28F and 28B to surround at least a portion of each outer edge to provide a hermetic seal. Edge seal 30 and front and back glass pane inner surfaces 24F and 24B define a sealed interior region 40. Sealed interior region 40 is preferably at least partially evacuated so that it has a vacuum pressure of less than one atmosphere, which provides VIG window 10 with desirable thermal and acoustic insulation properties.

VIG window 10 further includes a plurality of glass-bump spacers 50 integrally formed in inner surface 24B of back glass pane 20B. FIG. 3 is a close-up view of an example glass-bump spacer 50. Note that glass-bump spacers 50 are integrally formed in back glass pane 20B and are not added as separate or discrete elements to VIG window 10. Thus, glass-bumps 50 are formed from (and thus consist of) the same material as back glass pane 20B, and in fact are extensions of body portion 23B. Example methods of forming glass-bumps 50 are discussed in detail below.

In an example embodiment, glass-bump spacers 50 are regularly spaced with respect to one another. Because glass-bump spacers 50 are integrally formed in body portion 23B, they are substantially invisible when the VIG window 10 is viewed at regular (i.e., substantially normally incident) viewing angles. Consequently, glass-bumps 50 are shown in phantom in FIG. 1. Glass-bump 50 has a "tip" or "top portion" 51, as shown in FIG. 3. As discussed below, top portion 51 need not be rounded as is shown in FIG. 3. Glass-bump spacers 50 contact front pane inner surface 24F and serve to maintain the separation distance $D_G$ between front and back glass panes 20F and 20B.

In an example embodiment, glass panes 20F and 20B are formed from soda-lime glass or an alkali aluminosilicate glass, which in a further example embodiment have a respective thickness $T_G$ between 0.5 mm and 3 mm (e.g., 0.5, 0.7, 1, 1.5, 2, 2.5 or 3 mm). In an example embodiment, glass-bump spacers 50 have a height ("bump height") H in the range from 50 μm to 200 μm, more preferably in the range from 75 μm to 150 μm, and even more preferably in the range from 100 μm to 120 μm. In an example embodiment, glass panes 20F and 20B have substantially the same thickness $T_G$ (see FIG. 6).

FIG. 4A is a cross-sectional view similar to FIG. 2 and illustrates an example embodiment of a three-pane VIG window 10 that includes a middle glass pane 20M sandwiched between front pane 20F and back pane 20B. Middle glass pane 20M has a body portion 23M of a third glass material and has a front side 22M, a back side 24M and an edge 28M. First and second sets of glass-bump spacers 50 are respectively formed in both the front and back sides 22M and 24M of middle pane 20M and respectively serve to maintain distance $D_{GA}$ between middle glass pane 20M and front pane 20F, and distance $D_{GB}$ between the middle pane and back pane 20B. In the example embodiment shown in FIG. 4A, a single edge seal 30 serves to seal edges 28F, 28M and 28B. In another example embodiment, multiple edge seals 30 are used, where one edge seal serves to seal at least respective portions of edges 28F and 28M, and the other edge seal serves to seal at least respective portions of edges 28M and 28B (see FIG. 4B).

Edge seal 30 and glass pane surfaces 24F and 22M define a first sealed interior region 40A, while edge seal 30 and glass pane surfaces 24M and 24B define a second sealed interior region 40B. Sealed interior regions 40A and 40B are preferably evacuated so that they each have a vacuum pressure of less than one atmosphere, which provides triple-pane VIG window 10 with desirable thermal insulation and acoustic properties, and in particular with about twice the insulation of a two-pane VIG window 10 such as shown in FIG. 1 and FIG. 2.

FIG. 4B is similar to FIG. 4A, and illustrates an alternate example embodiment of a three-pane VIG window 10, wherein the second set of glass-bump spacers 50 are formed in inner surface 24B of back glass pane 20B rather than in the middle glass pane 20M. FIG. 4B also illustrates an example embodiment where multiple edge seals 30 are used, as described above.

FIG. 4C is similar to FIG. 4B, and illustrates yet another alternate example embodiment of a three-pane VIG window 10, wherein the first set of glass-bump spacers 50 are formed in inner surface 24F of front glass pane 20F rather than in the middle glass pane 20M. Thus, in the embodiment illustrated in FIG. 4C, the glass-bump spacers are formed in the inner and outer panes, while in the embodiment illustrated in FIG. 4A, the glass-bump spacers are formed in the middle pane.

As disclosed in further detail below, one or more optical coatings such as low-emissivity coatings, can be formed over the glass-bump spacers as well as over the surface in which the glass-bump spacers are formed. For the sake of clarity, the optical coating(s) have been omitted from the illustrated embodiments shown in FIGS. 1, 2 and 4.

In an example embodiment, middle glass pane 20M is formed from soda-lime glass or an alkali aluminosilicate glass, and in a further example embodiment has a thickness $T_G$ between 0.5 mm and 3 mm. In various embodiments, the first, second, and third glass materials making up body portions 23F, 23B and 23M can independently or in any combination comprise chemically-strengthened glass. In an example embodiment, the front, middle and back glass pane body portions 23F, 23M and 23B are made of the same glass material.

While soda-lime glass is the most common window glass, the VIG window disclosed herein can be applied to any type of glass in which integral glass-bump spacers 50 can be formed using the methods described in detail below. For example, the VIG window disclosed herein applies to low-iron ("ultra-clear") window glasses, as well as to the other glasses introduced and discussed below.

Glass-Bump Spacer Formation

Figure 5A:
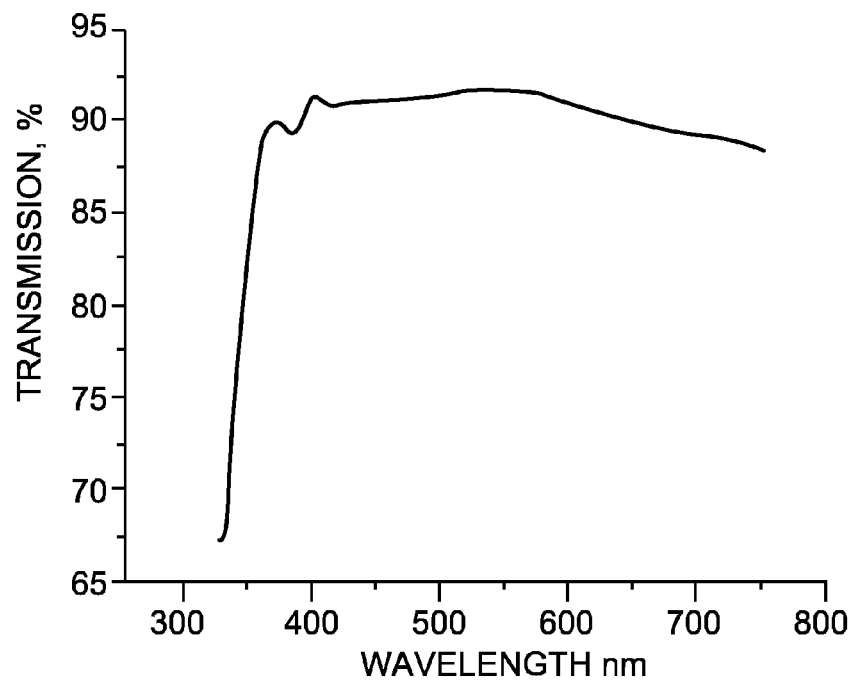
FIG. 5A and FIG. 5B illustrate typical transmission curves (transmission (%) vs. wavelength (nm)) in the UV and visible wavelength spectrums for transparent alkaline earth aluminosilicate glasses (FIG. 5A) and transparent soda-lime glasses (FIG. 5B)
Figure 5B:
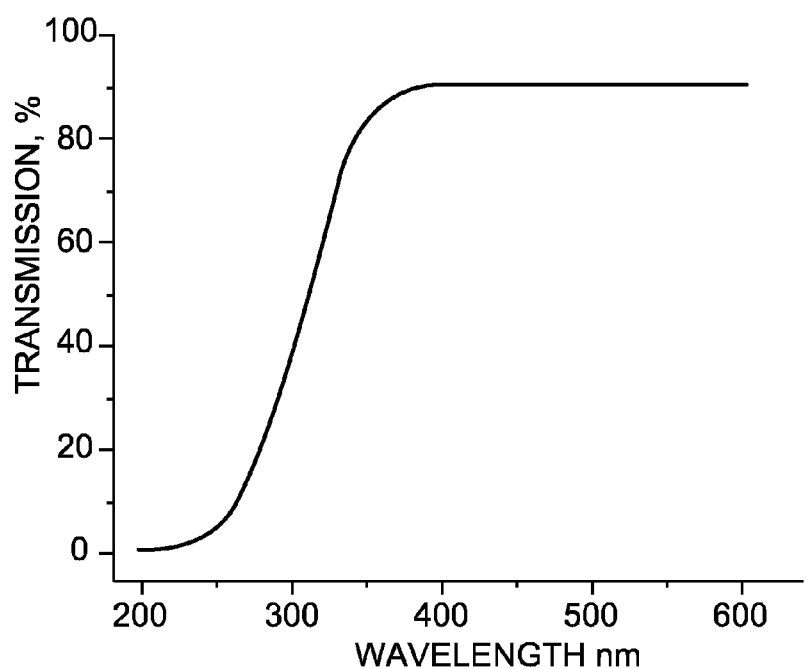

Available transparent glasses used for window panes tend to have very little absorption at wavelengths where high-power lasers are available, such as the near-infrared (NIR) band between about 800 μm and 1600 μm, or the ultraviolet (UV) band between about 340 nm and about 380 nm. For example, alkaline earth aluminosilicate glasses and sodium aluminosilicateglasses (e.g., glass such as Eagle$^{2000}$® glass, EagleXG™ glass, 1317 glass, and Gorilla™ glass, all available from Corning Incorporated, Corning, N.Y.) typically have a transmission spectra as shown in FIG. 5A, and soda-lime glass typically has a transmission spectra as shown in FIG. 5B. As evident from FIG. 5A and FIG. 5B, the transmission of alkaline earth aluminosilicate and soda-lime glasses is more than about 85% (including Fresnel losses due to reflection at the glass/air interface) at a wavelength of 355 nm, which poses a challenge for heating even small volumes of glass to temperatures close to a working point (~$10^5$ Poise) unless lasers with several hundred watts of available output power are used.

Unexpectedly, for certain transparent glass panes, including those formed from alkaline earth aluminosilicate glasses (e.g., LCD glasses such as the aforementioned Eagle 2000™ glass and Eagle XG™ glass), soda-lime glasses and sodium aluminosilicate glasses (e.g., the aforementioned 1317 glass and Gorilla™ glass), it has been found that absorption at the laser wavelength can be raised to a sufficient level by transmitting an intense UV laser beam through the transparent glass pane. In particular, a high repetition-rate, nanosecond-pulse-width UV laser was found to be the most effective. On the order of a second or two of exposure with such a pulsed UV laser beam was found to result in photo-induced absorption in the otherwise relatively low-absorption transparent glass. This induced glass absorption significantly increases at the UV wavelength, making it possible to locally heat the glass pane to its working temperature (using the same laser or a separate laser) and enables the formation of glass-bumps 50. The UV-generated absorption fades over a short period of time (e.g., a few seconds) once the irradiation is terminated.

Other types of lasers, such as mid-infrared-wavelength lasers, can be used instead of a UV laser for most transparent glass materials. An example mid-infrared-wavelength laser generates a laser beam having a wavelength of about 2.7 μm. For the sake of illustration, a UV laser is described and considered below in connection with the apparatus used to form the VIG windows disclosed herein.

Figure 6:
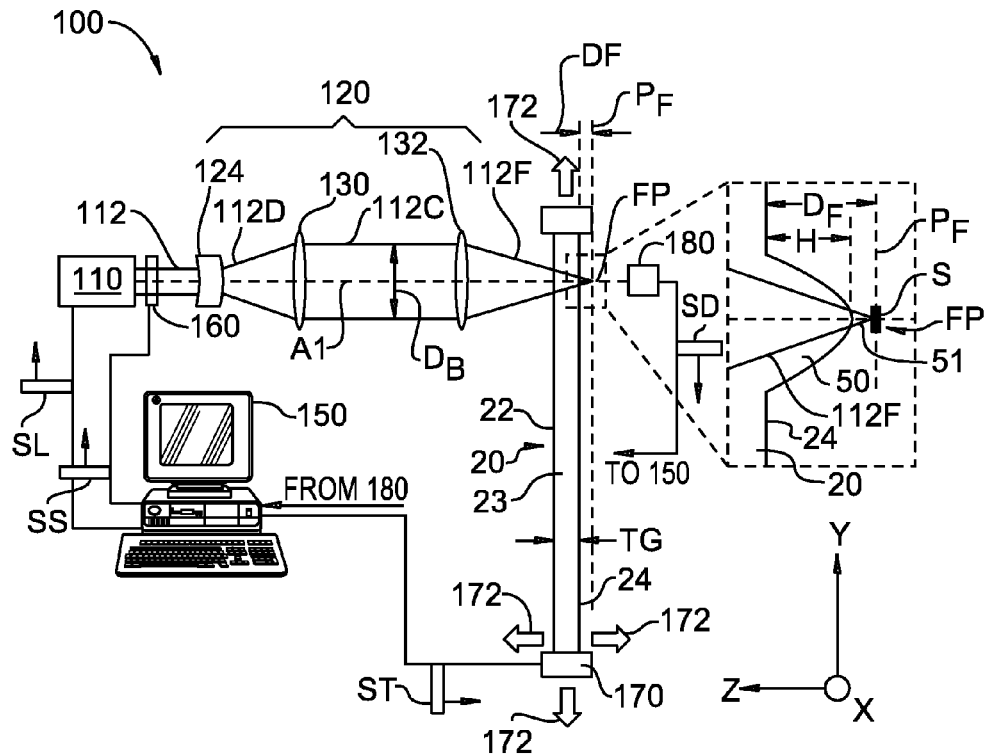
FIG. 6 is a schematic diagram of an example laser-based glass-bump-forming apparatus used to form glass-bump spacers in a glass pane in the process of forming a VIG window.

FIG. 6 is a schematic diagram of an example laser-based apparatus ("apparatus") 100 used to form glass-bump spacers 50 in a glass pane 20 in the process of forming VIG window 10. Apparatus 100 includes a laser 110 arranged along an optical axis A1. Laser 110 emits a laser beam 112 having power P along the optical axis. In an example embodiment, laser 110 operates in the ultraviolet (UV) region of the electromagnetic spectrum.

Figure 7:
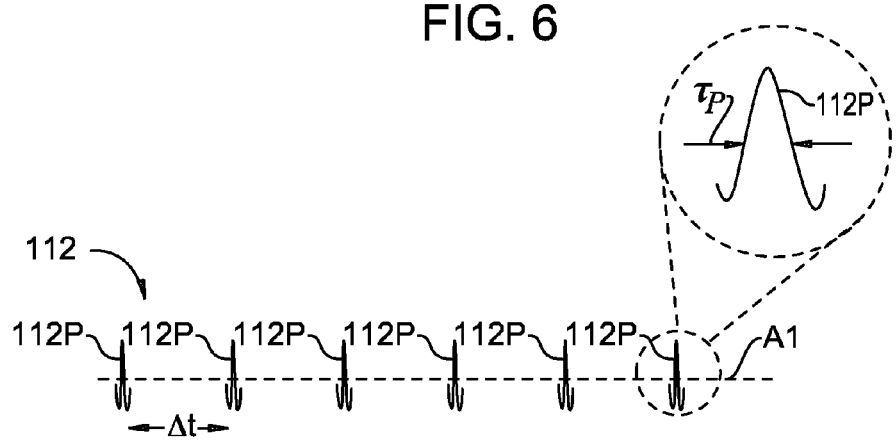
FIG. 7 is a schematic diagram of an example embodiment of a laser light beam as formed from light pulses from a pulsed laser.

With reference also to FIG. 7, in a particular example embodiment, laser 110 is a pulsed laser that generates light pulses 112P that constitute laser beam 112, wherein the light pulses have a UV wavelength (e.g., about 355 nm) and a nanosecond-scale temporal pulse width $\tau_P$. In an example embodiment, light pulses 112P have a temporal pulse width $\tau_P$ in the range 20 ns$\leq \tau_P \leq$80 ns, and a repetition rate R in the range 50 kHz$\leq$R$\leq$200 kHz. Further in the example embodiment, laser 110 is a 20 Watt laser (i.e., P=20 W). In an example embodiment, laser 110 comprises a third-harmonic Nd-based laser. As shown in FIG. 7, light pulses 112P are spaced apart in time by an amount Δt, thereby defining the repetition rate as R=1/Δt.

Apparatus 110 also includes a focusing optical system 120 that is arranged along optical axis A1 and defines a focal plane $P_F$ that includes a focal point FP. In an example embodiment, focusing optical system 120 includes, along optical axis A1 in order from laser 110: a combination of a defocusing lens 124 and a first focusing lens 130 (which combination forms a beam expander), and a second focusing lens 132. In an example embodiment, defocusing lens 124 has a focal length $f_D=-5$ cm, first focusing lens 130 has a focal length $f_{C1}=20$ cm, and second focusing lens 132 has a focal length $f_{C2}=3$ cm and a numerical aperture $NA_{C2}=0.3$. In an example embodiment, defocusing lens 124 and first and second focusing lenses 130 and 132 are made of fused silica and include anti-reflection (AR) coatings. Alternate example embodiments of focusing optical system 120 include mirrors or combinations of mirrors and lens elements configured to produce focused laser beam 112F from laser beam 112.

Apparatus 100 also includes a controller 150, such as a laser controller, a microcontroller, computer, microcomputer or the like, electrically connected to laser 110 and adapted to control the operation of the laser. In an example embodiment, a shutter 160 is provided in the path of laser beam 112 and is electrically connected to controller 150 so that the laser beam can be selectively blocked to turn the laser beam "ON" and "OFF" using a shutter control signal SS rather than turning laser 110 "ON" and "OFF" with a laser control signal SL.

Prior to initiating the operation of apparatus 100, glass pane 20 having a body portion 23 with a front surface 22 and back surface 24, is disposed relative to the apparatus. Specifically, glass pane 20 is disposed along optical axis A1 so that front and back glass pane surfaces 22 and 24 are substantially perpendicular to the optical axis and so that back glass pane surface 24 is slightly axially displaced from focal plane $P_F$ in the direction towards laser 110 (i.e., in the +Z direction) by a distance $D_F$. In an example embodiment, glass pane 20 has a thickness $T_G$ in the range 0.5 mm$\leq T_G \leq$6 mm. Also in an example embodiment, 0.5 mm$\leq D_F \leq$2 mm. In this arrangement, glass-bump spacers are to be formed in glass pane surface 24, which corresponds to surface 24B of back glass pane 20B of FIG. 2.

Laser 110 is then activated via control signal SL from controller 150 to generate laser beam 112. If shutter 160 is used, then after laser 110 is activated, the shutter is activated and placed in the "ON" position via shutter control signal SS from controller 150 so that the shutter passes laser beam 112. Laser beam 112 is then received by focusing optical system 120, and defocusing lens 124 therein causes the laser beam to diverge to form a defocused laser beam 112D. Defocused laser beam 112D is then received by first focusing lens 130, which is arranged to form an expanded collimated laser beam 112C from the defocused laser beam. Collimated laser beam 112C is then received by second focusing lens 132, which forms a focused laser beam 112F. Focused laser beam 112F passes through glass pane 20 and forms a focus spot S along optical axis A1 at focal point FP, which, as mentioned above, is at distance $D_F$ from glass pane back surface 24 and thus resides outside of body portion 23. It is noted here that glass pane 20 slightly affects the position of focal point FP of optical system 20 because focused laser beam 112F converges as it passes through the glass pane. However, the thickness $T_G$ of glass pane 20 is typically sufficiently thin so that this focus-shifting effect can be ignored.

A portion of focused laser beam 112F is absorbed as it passes through glass pane 20 due to the aforementioned photo-induced absorption in the glass pane. This serves to locally heat glass pane 20. The amount of photo-induced absorption is relatively low, e.g., about 3% to about 4%. When focused light beam 112F is locally absorbed in glass pane 20, a limited expansion zone is created within body portion 23 in which a rapid temperature change induces an expansion of the glass. Since the expansion zone is constrained by unheated (and therefore unexpanded) regions of glass surrounding the expansion zone, the glass within the expansion zone is compelled to relieve internal stresses by deforming upward, thereby forming a glass-bump spacer 50. As shown in the inset of FIG. 6, glass-bump spacer 50 has a peak 51 corresponding to the location of the highest beam intensity. In an example embodiment, glass-bump spacer 50 is fixed by rapidly cooling the heated region of the glass. This fixing can be accomplished by terminating the exposure with (i.e., the irradiation by) focused laser beam 112F.

If focused light beam 112F has a circularly symmetric cross-sectional intensity distribution, such as a Gaussian distribution, then the local heating and the attendant glass expansion occurs over a circular region in glass pane body 23, and the resulting glass-bump spacer 50 is substantially circularly symmetric.

The process can be repeated at different locations in the glass pane to form a plurality (e.g., an array) of glass-bump spacers 50 in glass pane 20. After formation of the glass-bump spacers, the glass pane can optionally be processed further and then incorporated into VIG window 10. In an example embodiment, apparatus 100 includes an X-Y-Z stage 170 electrically connected to controller 150 and configured to move glass pane 20 relative to focused laser beam 112F in the X, Y and Z directions, as indicated by large arrows 172. This allows for a plurality of glass-bump spacers 50 to be formed by selectively translating stage 170 via a stage control signal ST from controller 150 and irradiating different locations in glass pane 20.

In an example embodiment, glass-bump spacers 50 are formed in a regular array such as shown in FIG. 1. In an example embodiment, the spacing between adjacent glass-bump spacers 50 is between about 2 inches (i.e., about 5 cm) and 6 inches (i.e., about 15 cm). Also in an example embodiment, glass-bump spacer formation is controlled using a feedback device or system that tracks the growth of glass-bump spacers 50 so that the glass-bump spacers can be formed to have a select height H that is substantially uniform over the set of glass-bump spacers.

In one example embodiment, glass-bump spacer formation is tracked by measuring the transmission T of focused laser beam 112F through glass pane 20. In an example embodiment, this is accomplished by arranging a photodetector 180 along axis A1 at the output side of glass pane 20 and electrically connecting the photodetector to controller 150. The transmission T of focused laser beam 112F rapidly decreases when a glass-bump 50 is formed. Accordingly, this rapid drop in transmission can be detected by a change in an electrical detector signal SD generated by photodetector 180 in response to detecting transmitted light in focused laser beam 112F. Terminating the irradiation (exposure) with focused laser beam 112F (e.g., via the operation of controller 150 using control signals SL or SS as described above) stops the localized heating and fixes glass-bump spacer 50. In an example embodiment, the measured transmission T is used to control the irradiation dose.

In an alternate example embodiment, photodetector 180 is arranged adjacent the input side of glass pane 20 and detects fluorescence from glass pane body 23 during the irradiation process. A threshold change in detected fluorescence can then be used to terminate the exposure or to adjust the irradiation dose.

In another example embodiment, a feedback sub-system can be used to control the bump height of each glass-bump spacer by controlling the irradiating. For example, a feedback sub-system can be implemented to control the irradiating by monitoring one or more of a transmission intensity of the focused laser beam through the first glass pane, a temperature of each respective glass-bump spacer, a fluorescence intensity emanating from each respective glass-bump spacer, and a bump height of each respective glass-bump spacer, and terminating the irradiating when a predetermined value of the monitored variable is measured.

In another example embodiment, focusing optical system 120 is adapted for scanning so that focused laser beam 112F can be selectively directed to locations in glass pane 20 where glass-bump spacers 50 are to be formed.

Figure 8:
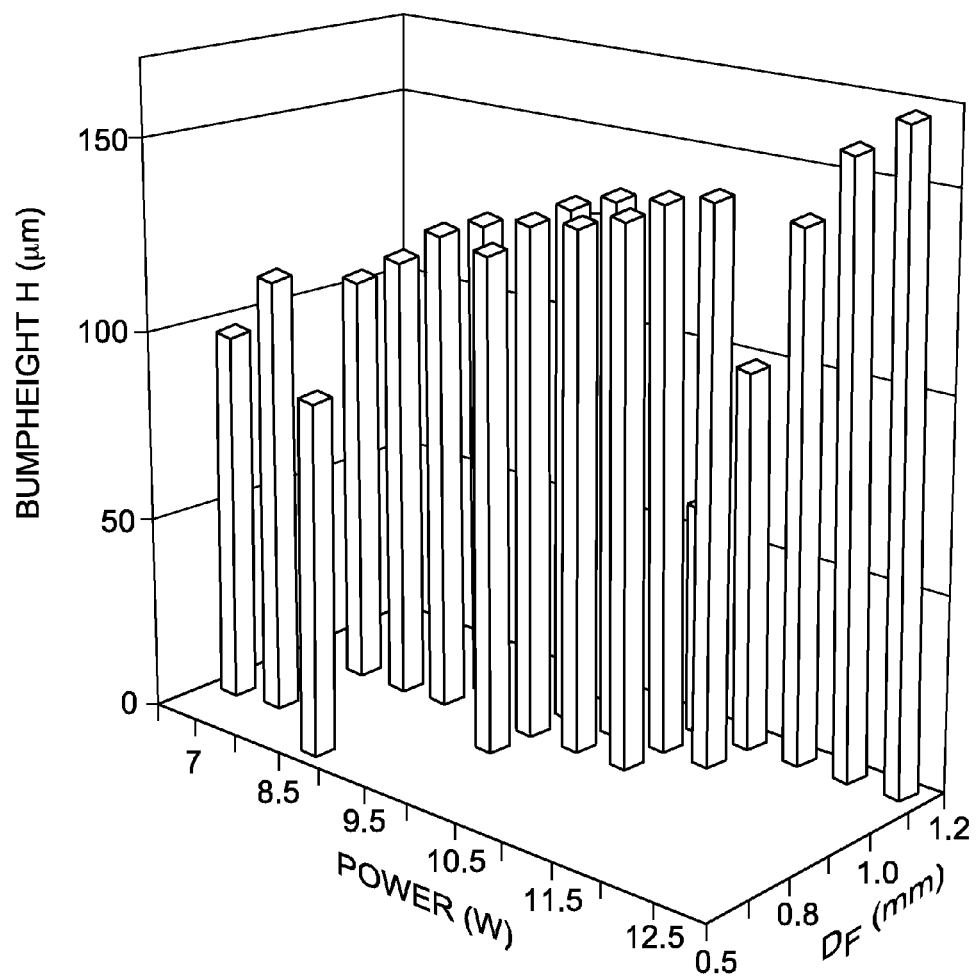
FIG. 8 is a bar graph that plots the laser power P (W), the distance $D_F$, and the glass-bump-spacer height H for a soda-lime glass pane.

Bump height H depends on several factors, which include the laser power P, the repetition rate R, the focusing conditions, and the glass material making up glass pane 20. FIG. 8 is a bar graph that plots the laser power (W) in focused laser beam 112F, distance $D_F$ between focal plane $P_F$ and back glass pane surface 24, and bump height H for a glass pane made of soda-lime glass having a thickness $T_G=3$ mm. The bar graph of FIG. 8 is based in experimental data and provides an example range of operating parameters for forming glass-bump spacers 50 using apparatus 100 for the particular type of glass pane 20. The exposure (irradiation) time used ranged between 2 to 2.5 sec and it was observed that this variation did not significantly affect the bump height H. The optimum repetition rate of the UV laser was found to be R=150 kHz. The bump height H ranged from about 75 μm for $D_F$ of about 0.6 mm and a laser power P of about 9 W to about 170 μm for $D_F$ of about 1.1 mm and a laser power of about 13 W.

Note that if bump heights H are too small, it could result in a reduction in the amount of vacuum that can be applied to interior region 40, leading to reduced insulation properties with too small a gap between adjacent glass panes 20. The smaller interior region volume that results also translates into reduced insulation properties. In addition, small bump heights H can give rise to the appearance of "Newton's rings" due to light interference between closely arranged glass surfaces. It is estimated that a bump height H≥100 μm is sufficient to overcome these two potential problems for most VIG windows 10.

Figure 9:
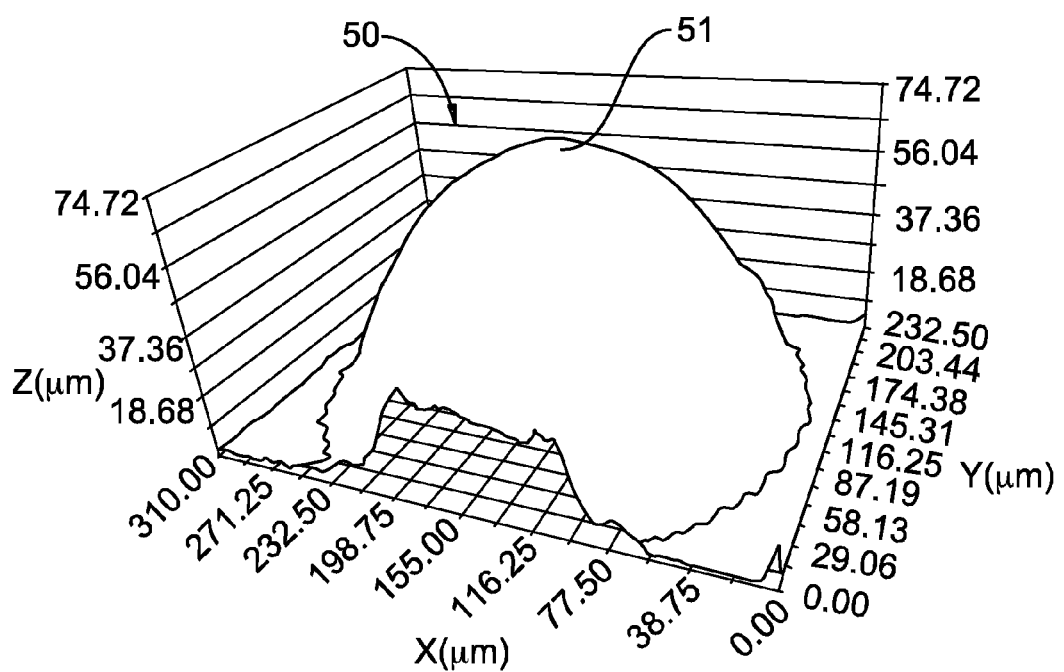
FIG. 9 is a three-dimensional image of a glass-bump spacer formed in a 3-mm soda-lime glass pane sample.
Figure 10:
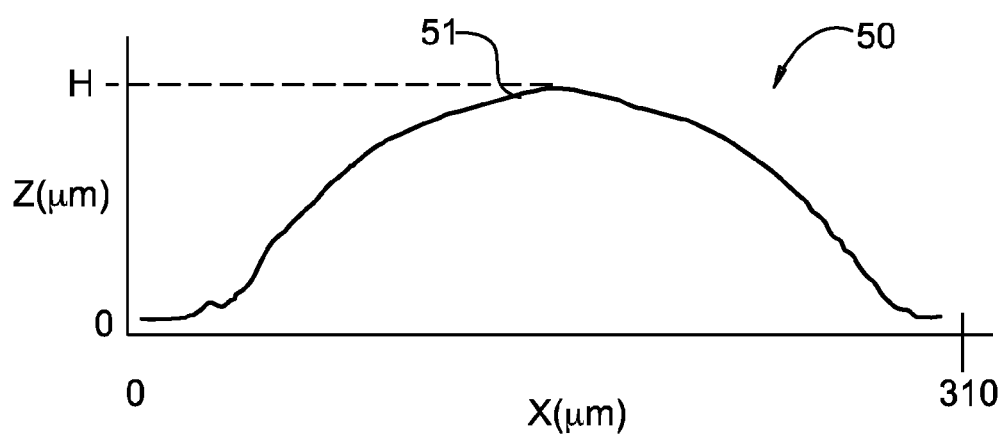
FIG. 10 is a line scan of the glass-bump spacer of FIG. 9, revealing a substantially hemispherical bump profile.

FIG. 9 is a three-dimensional image of a glass-bump spacer 50 formed in a soda-lime glass pane having a thickness $T_G=3$ mm. FIG. 10 is a line-scan of glass-bump spacer 50 of FIG. 9. The line scan reveals that glass-bump spacer 50 has a substantially hemispherical shape, a bump height H of about 75 μm and a base diameter $D_B$ of about 250 gm. In an embodiment, by providing glass-bump spacers 50 having a small and curved point of contact with an opposing glass pane, abrasion of the optical coating can be minimized. Moreover, by minimizing the contact area between each glass-bump spacer and the opposing glass pane, thermal transfer via the glass-bump spacers can be minimized while achieving a mechanically robust VIG window.

Figure 11:
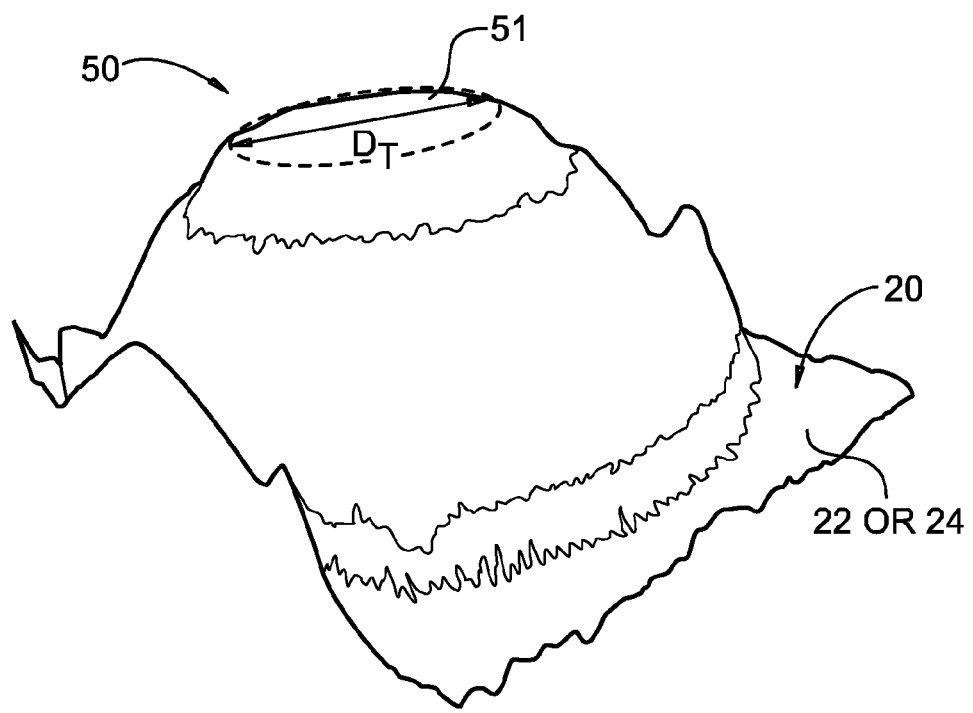
FIG. 11 is a three-dimensional image of a glass-bump spacer similar to that shown in FIG. 9, except that the glass-bump spacer has a substantially flat top portion.

FIG. 11 is a three dimensional image of a glass-bump spacer 50 similar to that shown in FIG. 9, except that a growth-limiting surface in the form of a glass plate was placed adjacent glass pane surface 24 and then the glass pane irradiated as per above. The resulting glass-bump spacer 50 grew to a certain bump height H and then this growth was limited by the adjacent glass plate. The result was a glass-bump spacer 50 having a substantially flat top portion 51 with a diameter $D_T$. In this way, the area, height and shape of glass-bumps 50 can be controlled, and in particular the diameter $D_T$ (and thus the surface area) of substantially flat top portion 51 can be controlled. In an example embodiment, substantially flat top portion 51 has a substantially circular shape so that its surface area SA is approximated by the relationship $SA=\pi[D_T/2]^2$. The total contact area $SA_T$ presented by a set of n glass-bump spacers 50 is approximated by $SA_T=\pi n[D_T/2]^2$.

The size, shape and height of glass-bump spacers 50 can be more accurately controlled by using more complicated growth-limiting configurations or by altering the cross-sectional shape of focused laser beam 112F. An advantage of controlling bump height H is that it mitigates the variability in bump heights due to glass non-uniformity and minor laser instability. Another advantage of substantially flat-top glass-bump spacers 50 is the reduction (including the minimization) of mechanical stresses at the contact point between tip portions 51 and glass 20F.

In an example embodiment of VIG window 10, the total contact area $SA_T$ is selected to increase and preferably optimize the thermal insulation. It is estimated that for glass-bump spacers 50 having a base diameter $D_B$ in the range from about 300 μm to about 700 μm, the substantially flat top portion 51 preferably has a "top" diameter $D_T \leq 100$ μm, more preferably $D_T \leq 75$ μm, and even more preferably $D_T \leq 50$ μm.

Apparatus 100 enables glass-bump spacers 50 to have a hemispherical shape largely because the swelling of the glass that causes bump formation is controlled by the surface tension of the molten glass. This effect is exploited by using a focused laser beam 112F having a circularly symmetric cross-section. A rounded profile for glass-bump spacers 50 is advantageous in that it provides minimal total contact area $S_{AT}$ between the glass-bump spacers and the adjacent glass pane, thereby reducing the heat conductivity between the two glass panes. It is important to reduce (and preferably minimize) this heat transfer mechanism in VIG windows 10 because thermal insulation diminishes with increased total contact area $SA_T$. On the other hand, a very small contact area SA per glass-bump spacer 50 may lead to local stress concentration and can potentially damage the adjacent glass pane 20 and/or optical coatings 210.

To assess the visibility of laser-grown glass-bump spacers 50 in VIG window 10 versus that of discrete spacers used in conventional VIG windows, several photos were taken at different tilt angles relative to the surface normal of the VIG window. While glass-bump spacers 50 were visible when viewed at glazing incident angles, they became practically invisible at the more usual near-incident viewing angles. The photos of VIG window 10 were then compared to photos taken under virtually identical conditions for a commercial window pane having discrete ceramic spacers. The discrete ceramic spacers were much more visible, particularly at the usual, near-incident viewing angles.

As shown in FIG. 4A, in an example embodiment, glass-bump spacers 50 are formed in both sides 22M and 24M of middle glass pane 20M to form triple-pane VIG window 10. Double-side glass-bump spacers 50 are formed in one example embodiment by altering the irradiation conditions as compared with forming single-side bumps. By way of example, in one approach glass-bump spacers 50 are formed in one side 22M of glass pane 20M, and then the glass pane is turned over and more glass-bumps are formed in the other side 24M. In this embodiment, it may be necessary to slightly displace the two sets of glass-bump spacers 50 formed in the respective sides of middle glass pane 20M to avoid irradiating the previously formed glass-bump spacers. The amount of this displacement is, for example, equal to or up to about twice the base diameter $D_B$, which is typically in the order of 200 μm to 700 μm and is thus quite small when compared to the size of a typical VIG window 10.

It is anticipated that the use of integrally formed glass-bump spacers 50 for VIG windows 10 will be more cost effective than disposing and fixing discrete (i.e., non-integral) spacers to a glass pane. This is largely because the disclosed approach obviates the need for equipment and processes for placing discrete spacers in precise positions and keeping them in place while assembling the VIG window. Because of the smaller and controllable contact area SA between the tip portion 51 of glass-bump 50 and adjacent glass pane 20, heat transfer through VIG window 10 via thermal conduction is reduced (and preferably minimized) relative to the use of discrete spacers. Cost advantages become even more evident in the case of manufacturing a triple-pane VIG window, where handling and placement of the discrete spacers can be quite challenging.

Example embodiments of VIG window 10 employ glass panes 20 having different material compositions. For example, one glass pane 20 (e.g., back glass pane 20B in FIG. 2) is formed from a first glass type and another glass pane (e.g., front glass pane 20F) is formed from a second glass type. For example, the first glass type is soda-lime window glass while the second glass type is an ion-exchanged sodium aluminosilicate glass (e.g., 1317, 2317, and others), or vice versa. Furthermore, in embodiments where a chemically-strengthened (e.g., ion-exchanged) glass pane is used, the chemically-strengthened pane can be thinner (e.g., 0.5-2 mm) than conventional (e.g., 2-4 mm soda-lime) glass panes, which can reduce the total thickness and weight of a VIG window 10 while maintaining comparable or superior mechanical properties.

Glass-bump formation experiments conducted in sodium aluminosilicate glass 1317 ("1317 glass") revealed a high degree of swelling capability, with bump heights H of 155 µm formed in a sample having a thickness $T_G$=1.3 mm. It is noted here that soda-lime window glass and 1317 glass have similar coefficients of thermal expansion (CTEs) of about 9 ppm/° C.

In experiments conducted in "ultra-white" window glass panes 20 that have a very low iron content (and thus do not have a greenish tint), glass-bump spacers 50 with bump heights H of about 212 µm were formed using the above methods. Thus, in an example embodiment, glass-bump spacers 50 formed in low-iron content glasses have a bump height H in the range from 75 µm to 225 µm, more preferably in the range from 100 µm to 225 µm, and even more preferably in the range from 150 µm to 225 µm.

Glass panes for use in VIG windows can be made using a variety of glass sheet forming methods. Example glass sheet forming methods include fusion draw and slot draw processes, which are each examples of a down-draw process, as well as float processes. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an example process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress. Glass sheets, once formed, can be cut and shaped as desired to form a window pane for incorporation into a VIG window.

The glass window can be substantially flat or shaped for certain applications. For instance, the windows can be formed as bent or shaped parts for use as windshields or cover plates. The structure of a shaped VIG window may be simple or complex. In certain embodiments, a shaped VIG window may have a simple curvature. In certain embodiments, a shaped VIG window may have a complex curvature where the glass panes have a distinct radius of curvature in two independent directions. Such shaped or curved glass panes may thus be characterized as having "cross curvature," where the glass is curved along an axis that is parallel to a given dimension and also curved along an axis that is perpendicular to the same dimension. An automobile sunroof, for example, typically measures about 0.5 m by 1.0 m and has a radius of curvature of 2 to 2.5 m along the minor axis, and a radius of curvature of 4 to 5 m along the major axis.

Shaped VIG windows according to certain embodiments can be defined by a bend factor, where the bend factor for a given part is equal to the radius of curvature along a given axis divided by the length of that axis. Thus, for the example automotive sunroof having radii of curvature of 2 m and 4 m along respective axes of 0.5 m and 1.0 m, the bend factor along each axis is 4. Shaped glass windows can have a bend factor ranging from 2 to 8 (e.g., 2, 3, 4, 5, 6, 7, or 8).

Methods for bending and/or shaping glass panes can include gravity bending, press bending and methods that are hybrids thereof.

In a traditional method of gravity bending thin, flat sheets of glass into curved shapes such as automobile windshields, cold, pre-cut single or multiple glass sheets are placed onto the rigid, pre-shaped, peripheral metal support surface of a bending fixture. Prior to bending, the glass typically is supported only at a few contact points. The glass is heated, usually by exposure to elevated temperatures in a lehr, which softens the glass allowing gravity to sag or slump the glass into conformance with the peripheral support surface. Substantially the entire support surface generally will then be in contact with the periphery of the glass.

A related technique is press bending where flat glass sheets are heated to a temperature corresponding substantially to the softening point of the glass. The heated sheets are then pressed or shaped to a desired curvature between male and female mold members having complementary shaping surfaces.

A thickness of the assembled VIG window can range from about 2 mm to 4 mm, where the individual glass panes can have a thickness of from 0.5 to 2 mm (e.g., 0.1, 0.2, 0.3, 0.5, 0.7, 1, 1.4, 1.7, or 2 mm). In embodiments, a chemically-strengthened glass sheet can have a thickness of less than 1.4 mm or less than 1.0 mm.

Chemically-Strengthened Glass Sheets

As noted above, the vacuum insulated glass windows disclosed herein comprise one or more chemically-strengthened glass sheets. Due to chemical strengthening, one or both of the surfaces of the chemically-strengthened panes that are incorporated into the VIG windows are under compression. In order for flaws to propagate and failure of the glass to occur, the tensile stress from an impact must exceed the surface compressive stress. In embodiments, the high compressive stress and high depth of layer of chemically-strengthened glass sheets enable the use of thinner glass than in the case of non-chemically-strengthened glass.

Glass sheets may be chemically strengthened by an ion exchange process. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours. The incorporation of the larger ions into the glass strengthens the sheet by creating a compressive stress in a near surface region. A corresponding tensile stress is induced within a central region of the glass to balance the compressive stress.

Example ion-exchangeable glasses that are suitable for forming glass panes are alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One example glass composition comprises $SiO_2$, $B_2O_3$ and $Na_2O$, where $(SiO_2+B_2O_3) \geq 66$ mol %, and $Na_2O \geq 9$ mol %. In an embodiment, the glass sheets include at least 6 wt. % aluminum oxide. In a further embodiment, a glass sheet includes one or more alkaline earth oxides, such that a content of alkaline earth oxides is at least 5 wt.%. Suitable glass compositions, in some embodiments, further comprise at least one of $K_2O$, MgO, and CaO. In a particular embodiment, the glass can comprise 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO.

A further example glass composition suitable for forming glass panes comprises: 60-70 mol % $SiO_2$, 6-14 mol % $Al_2O_3$, 0-15 mol % $B_2O_3$, 0-15 mol % $Li_2O$, 0-20 mol % $Na_2O$, 0-10 mol % $K_2O$, 0-8 mol % MgO, 0-10 mol % CaO, 0-5 mol % $ZrO_2$, 0-1 mol % $SnO_2$, 0-1 mol % $CeO_2$, less than 50 ppm $As_2O_3$, and less than 50 ppm $Sb_2O_3$, where 12 mol %$\leq(Li_2O+Na_2O+K_2O)\leq$20 mol % and 0 mol %$\leq$(MgO+CaO)$\leq$10 mol %.

A still further example glass composition comprises: 63.5-66.5 mol % $SiO_2$, 8-12 mol % $Al_2O_3$, 0-3 mol % $B_2O_3$, 0-5 mol % $Li_2O$, 8-18 mol % $Na_2O$, 0-5 mol % $K_2O$, 1-7 mol % MgO, 0-2.5 mol % CaO, 0-3 mol % $ZrO_2$, 0.05-0.25 mol % $SnO_2$, 0.05-0.5 mol % $CeO_2$, less than 50 ppm $As_2O_3$, and less than 50 ppm $Sb_2O_3$, where 14 mol %$\leq(Li_2O+Na_2O+K_2O)\leq$18 mol % and 2 mol %$\leq$(MgO+CaO)$\leq$7 mol %.

In a particular embodiment, an alkali aluminosilicate glass comprises alumina, at least one alkali metal and, in some embodiments, greater than 50 mol % $SiO_2$, in other embodiments at least 58 mol % $SiO_2$, and in still other embodiments at least 60 mol % $SiO_2$, wherein the ratio $$\frac{Al_2O_3 + B_2O_3}{\Sigma \text{ modifiers}} > 1.$$

In the expressed ratio the components are expressed in mol % and the modifiers are alkali metal oxides. Such a glass, in particular embodiments, comprises, consists essentially of, or consists of: 58-72 mol % $SiO_2$, 9-17 mol % $Al_2O_3$, 2-12 mol % $B_2O_3$, 8-16 mol % $Na_2O$, and 0-4 mol % $K_2O$, wherein the ratio $$\frac{Al_2O_3 + B_2O_3}{\Sigma \text{ modifiers}} > 1.$$

In another embodiment, an alkali aluminosilicate glass comprises, consists essentially of, or consists of: 61-75 mol % $SiO_2$, 7-15 mol % $Al_2O_3$, 0-12 mol % $B_2O_3$, 9-21 mol % $Na_2O$, 0-4 mol % $K_2O$, 0-7 mol % MgO, and 0-3 mol % CaO.

In yet another embodiment, an alkali aluminosilicate glass substrate comprises, consists essentially of, or consists of: 60-70 mol % $SiO_2$, 6-14 mol % $Al_2O_3$, 0-15 mol % $B_2O_3$, 0-15 mol % $Li_2O$, 0-20 mol % $Na_2O$, 0-10 mol % $K_2O$, 0-8 mol % MgO, 0-10 mol % CaO, 0-5 mol % $ZrO_2$, 0-1 mol % $SnO_2$, 0-1 mol % $CeO_2$, less than 50 ppm $As_2O_3$, and less than 50 ppm $Sb_2O_3$, wherein 12 mol %$\leq Li_2O+Na_2O+K_2O \leq$20 mol % and 0 mol %$\leq$MgO+CaO$\leq$10 mol %.

In still another embodiment, an alkali aluminosilicate glass comprises, consists essentially of, or consists of: 64-68 mol % $SiO_2$, 12-16 mol % $Na_2O$, 8-12 mol % $Al_2O_3$, 0-3 mol % $B_2O_3$, 2-5 mol % $K_2O$, 4-6 mol % MgO, and 0-5 mol % CaO, wherein: 66 mol %$\leq SiO_2+B_2O_3+CaO \leq$69 mol %, $Na_2O+K_2O+B_2O_3+MgO+CaO+SrO>$10 mol %, 5 mol %$\leq$MgO+CaO+SrO$\leq$8 mol %, $(Na_2O+B_2O_3)-Al_2O_3\leq$2 mol %, 2 mol %$\leq Na_2O-Al_2O_3\leq$6 mol %, and 4 mol %$\leq(Na_2O+K_2O)-Al_2O_3\leq$10 mol %.

The window glass, in some embodiments, is batched with 0-2 mol % of at least one fining agent selected from a group that includes $Na_2SO_4$, NaCl, NaF, NaBr, $K_2SO_4$, KCl, KF, KBr, and $SnO_2$.

In one example embodiment, sodium ions in the glass can be replaced by potassium ions from the molten bath, though other alkali metal ions having a larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

Optical Coatings

One or more optical coatings may be incorporated into a VIG window. In embodiments, the optical coatings comprise one or more polymer layers that may provide complimentary or distinct functionality, including acoustic control, UV transmission control, and/or IR transmission control.

Low-emissivity coatings typically include a layer of an infrared-reflecting film and one or more optional layers of a transparent dielectric film. The infrared-reflecting film, which generally comprises a conductive metal such as silver, gold or copper, reduces the transmission of heat through the coated pane. A dielectric film can be used to anti-reflect the infrared-reflecting film and to control other properties and characteristics of the coating, such as color and durability. Commonly used dielectric materials include oxides of zinc, tin, indium, bismuth, and titanium, among others.

Example low-emissivity coatings include one or two silver layers each sandwiched between two layers of a transparent dielectric film. Increasing the number of silver layers can increase the total infrared reflection, although additional silver layers can also reduce the visible transmission through the window and/or negatively impact the coating's color or durability.

Optical coatings may be applied using a conventional film-forming process such as physical or chemical vapor deposition or, for larger area glass panes, via lamination. During the lamination process, a thin film of the coating material is typically heated to a temperature effective to soften the coating material, which promotes a conformal mating of the coating material to a surface of a glass panes. Mobile polymer chains within the coating material develop bonds with the glass surfaces, which promote adhesion. Elevated temperatures also accelerate the diffusion of residual air and/or moisture from the glass-coating interface.

The application of pressure both promotes flow of the coating material, and suppresses bubble formation that otherwise could be induced by the combined vapor pressure of water and air trapped at the interfaces. To suppress bubble formation, heat and pressure are simultaneously applied to the assembly in an autoclave.

Figure 12:
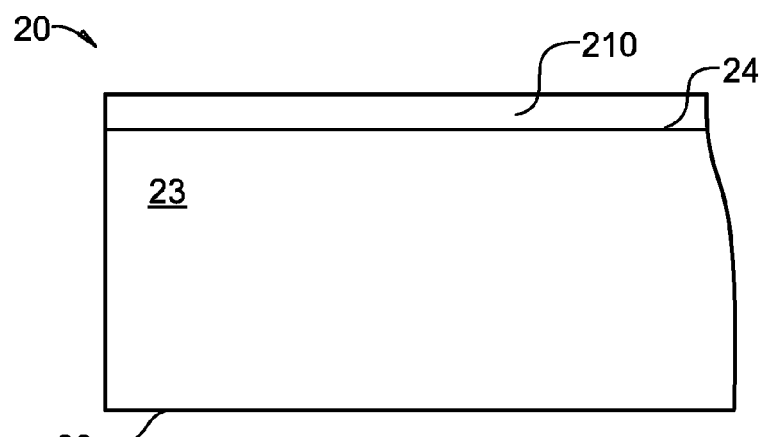
FIG. 12 is a schematic side view of an example glass pane having an infrared-reflective coating.

FIG. 12 is a schematic side view of an example glass pane 20 that has an infrared-reflective coating 210 formed over back surface 24. Such glass panes are useful in VIG windows because they can attenuate the amount of transmitted (i.e., heat generating) radiation.

Figure 13:
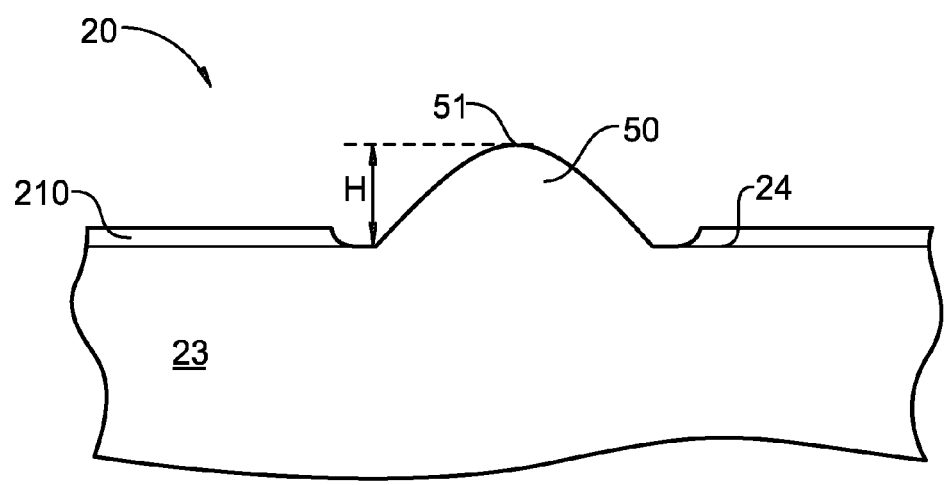
FIG. 13 is a close-up, cross-sectional view of an uncoated glass-bump spacer formed in the glass pane of FIG. 12.

FIG. 13 is a close-up cross-sectional view similar to that of FIG. 12, but for the IR-reflective glass pane 20 of FIG. 12, showing a glass-bump spacer 50 formed thereon. If the reflective coating 210 is formed prior to forming the glass-bump spacer, since the coating 210 has a much lower melting point than glass pane 20, it melts away from the vicinity of glass-bump spacer 50, leaving it uncoated. Any remnants of coating 210 are easily removed by cleaning back surface 24 using standard glass cleaning techniques.

Figure 14:
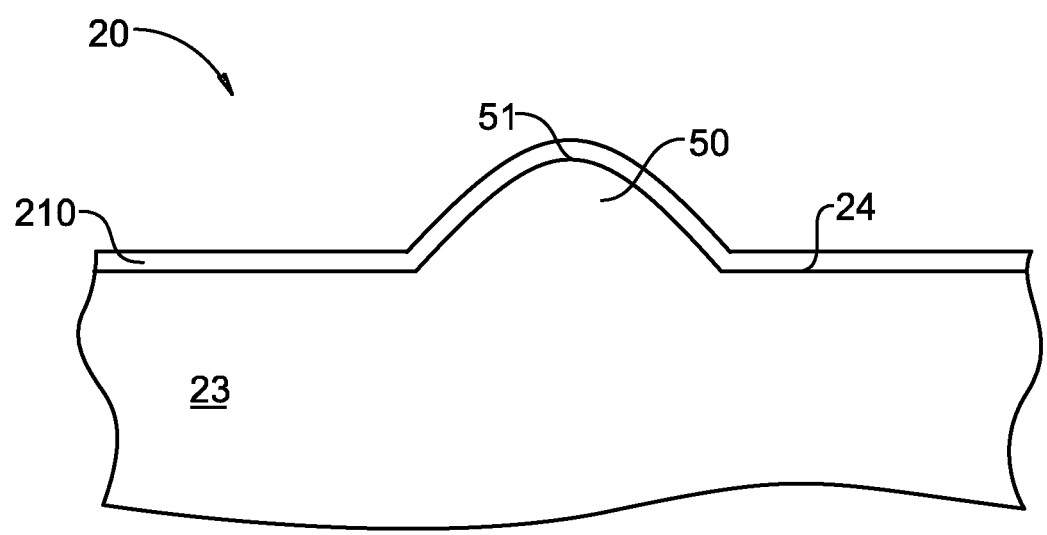
FIG. 14 is a close-up, cross-sectional view of a coated glass-bump spacer formed in the glass pane of FIG. 12.

In contrast, by incorporating the reflective coating 210 after formation of the glass-bump spacer 50, the reflective coating 210 forms a substantially conformal coating over the entire back surface of the pane, including the glass-bump spacer 50. FIG. 14 is a cross-sectional view of an IR-reflective pane 20 comprising a reflective coating 210 formed over back surface 24 as well as over glass-bump spacer 50 formed in the back surface.

VIG Window Formation

An embodiment of the disclosure relates to forming a VIG window, such as VIG window 10. With reference to FIG. 14 and again to FIG. 1 and FIG. 2, an example method of forming a VIG window 10 includes forming, in a first (back) glass pane 20B comprising a first glass material, a plurality of glass-bump spacers 50 consisting of the first glass material from the first body portion 23. The method then includes forming an optical coating over both the glass-bump spacers and the surface in which the glass bump spacers are formed and bringing a second (front) glass pane 20F of a second glass material in contact with the first plurality of glass-bump spacers 50 so that the first and second glass panes are spaced apart by first distance $D_G$ between respective surfaces 24F and 24B. The method then includes sealing at least respective portions of the first and second edges 28F and 28B with edge seal 30 to define interior region 40 between front and back glass panes 20F and 20B. Interior region 40 is then at least partially evacuated to form a vacuum pressure therein of less than one atmosphere. In embodiments, one or both panes of glass can comprise chemically-strengthened glass. In a particular example embodiment, the second glass pane is a chemically-strengthened glass pane.

A method of forming a three-pane VIG window 10 is similar to the formation of the two-pane VIG window and is now discussed with reference to FIG. 4A, FIG. 4B and FIG. 4C. With reference first to FIG. 4A, in an example embodiment the formation of three-pane VIG window 10 involves forming two sets of glass-bump spacers in a middle ("first") glass pane 20M that resides between front (second) and back (third) glass panes 20F and 20B. Middle glass pane 20M thus has first and second pluralities (sets) of glass-bump spacers 50 in respective surfaces 22M and 24M. Middle glass pane 20M also has an outer edge 28M and is made up of a first glass material.

The method further includes forming an optical coating 210 over one or both of the surfaces of the middle glass pane, such that each optical coating 210 is formed over both the glass-bump spacers 50 and over the respective surface 22M and 24M in which the glass bump spacers are formed. Then, the front and back glass panes 20F and 20B (made up of a second and third glass materials, respectively) can be brought into respective contact with the first and second plurality of glass-bump spacers 50 so that front, middle and back glass panes 20F, 20M and 20B are spaced apart by a distance $D_{GA}$ between surfaces 24F and 22M, and so that middle and back glass panes 20M and 20B are spaced apart by a distances $D_{GB}$ between surfaces 24M and 24B.

Figure 15:
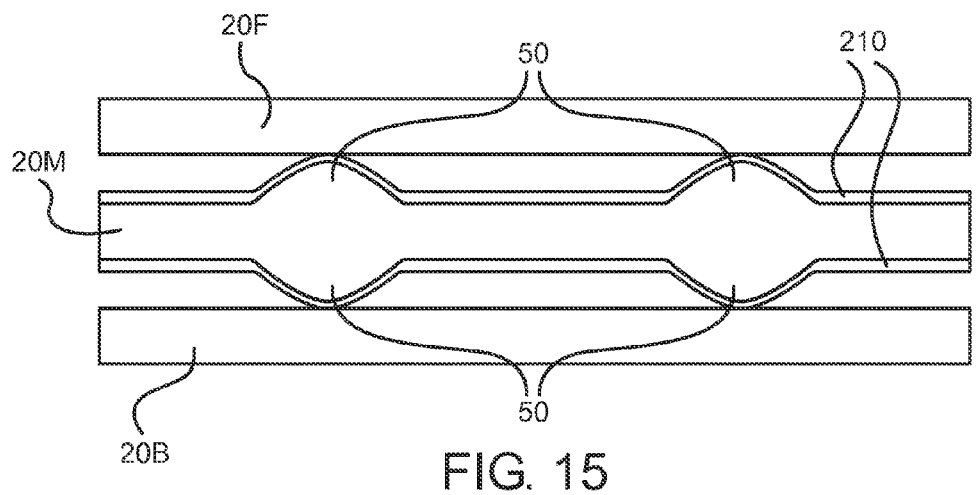
FIG. 15 is a cross-sectional view of the glass pane assembly in a VIG window according to one embodiment.

The method then includes sealing at least respective portions of the front, middle and back edges 28F, 28M and 28B of the three glass panes with one or more edge seals 30 (one edge seal 30 is shown in FIG. 4A). This serves to define first and second interior regions 40A and 40B between the front and middle glass panes 20F and 20M and the middle and back glass panes 20M and 20B, respectively. Interior regions 40A and 40B are then at least partially evacuated to form respective vacuum pressures therein of less than one atmosphere. In embodiments, at least on the glass panes is a chemically-strengthened glass pane. In a particular example embodiment, the first and third glass panes are chemically-strengthened glass panes. The configuration of the glass panes showing conformal optical coatings formed over the middle pane is shown schematically in FIG. 15.

Figure 16:
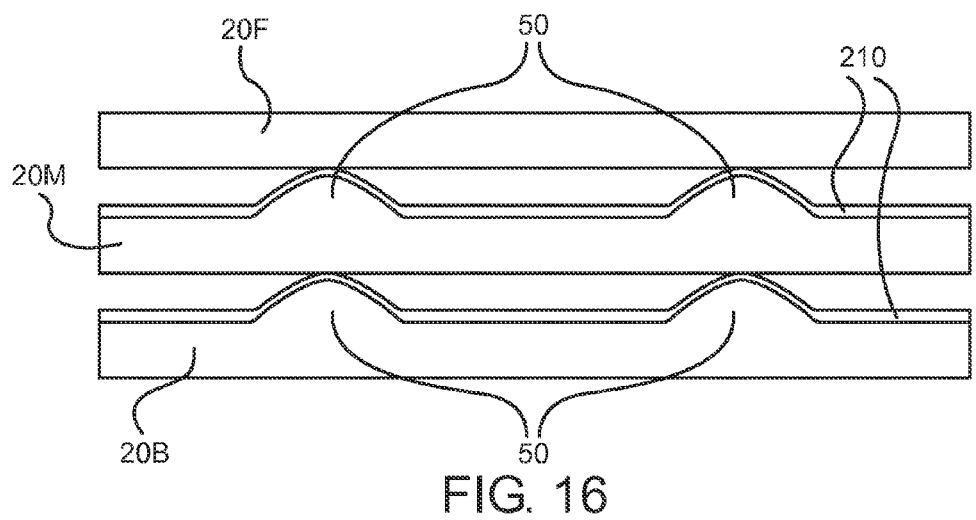
FIG. 16 is a cross-sectional view of the glass pane assembly in a VIG window according to a further embodiment.
Figure 17:
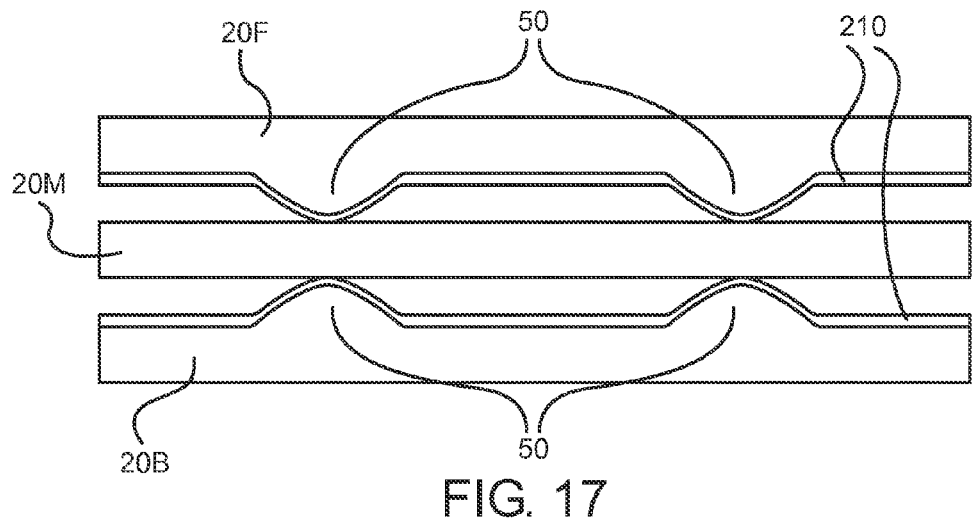
FIG. 17 is a cross-sectional view of the glass pane assembly in a VIG window according to yet a further embodiment.

In alternate embodiments that are illustrated with reference to FIG. 4B and FIG. 4C, rather than forming both sets of glass-bump spacers 50 in middle glass pane 20M, they can be formed, as illustrated with reference to FIG. 4B and FIG. 16, in one surface 22M of the middle pane 20M and in inner surface 24B of back glass pane 20B or, as shown as illustrate with reference to FIG. 4C and FIG. 17, in inner surface 24F of the front glass pane 20F and in inner surface 24B of back glass pane 20B. The optical coatings and edge seals can be formed as described above. By way of example, as shown in FIG. 4B, the method of forming triple-pane VIG window 10 can include using one edge seal 30 to seal at least respective portions of edges 28F and 28M to form the vacuum seal for first interior regions 40A, and another edge seal to seal at least respective portions of edges 28M and 20B to form the vacuum seal for second interior region 40B.

The foregoing low-E VIG windows can be used to provide beneficial effects, including the attenuation of acoustic noise, reduction of UV and/or IR light transmission, and/or enhancement of the aesthetic appeal of a window opening in a light-weight, mechanically-robust package.

As used herein, the singular forms "a," "an," and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A vacuum-insulated glass (VIG) window, comprising:
   a first glass pane having a first body formed from a first glass material and having first opposite surfaces and a first outer edge;
   a second glass pane spaced apart from and disposed substantially parallel to the first glass pane at a first distance and having a second body formed from a second glass material and having second opposite surfaces and a second outer edge;
   a first edge seal formed around at least respective portions of the first and second outer edges so as to define a first sealed interior region between the first and second glass panes, wherein the first sealed interior region has a vacuum pressure of less than one atmosphere;
   a first plurality of glass-bump spacers integrally formed in one of the first surfaces of the first glass pane and consisting of the first glass material from the first body portion, and
   a first optical coating formed over both the first plurality of glass-bump spacers and the first surface in which the first plurality of glass-bump spacers are formed, wherein
   the first glass pane comprises an ion-exchanged glass material,
   the optical coating comprises a polymer layer or a dielectric layer, and
   the first plurality of coated glass-bump spacers contact the second glass pane so as to maintain said spaced apart first distance.

2. The VIG window of claim 1, wherein the second glass pane comprises an ion-exchanged glass material.

3. The VIG window of claim 1, wherein the first glass-bump spacers have a bump height H defined by $75\ \mu m \leq H \leq 225\ \mu m$.

4. The VIG window of claim 1, wherein the first and second glass panes have respective thicknesses of less than 1 mm.

5. The VIG window of claim 1, wherein the window is substantially flat.

6. The VIG window of claim 1, wherein the window is shaped.

7. The VIG window of claim 1, further comprising:
   a third glass pane spaced apart from and disposed substantially parallel to the first glass pane at a side opposite the second glass pane and at a second distance, the third glass pane having a third body formed from a third glass material and having third opposite surfaces and a third outer edge;
   a second plurality of glass-bump spacers integrally formed in the first glass pane in the surface opposite that having the first plurality of glass-bump spacers, the second plurality of glass-bump spacers consisting of glass material from the first body portion;
   a second optical coating formed over both the second plurality of glass-bump spacers and the opposite surface in which the second plurality of glass-bump spacers are formed, wherein
   the second plurality of coated glass-bump spacers contact the third glass pane so as to maintain said spaced apart second distance, and
   either a) the first edge seal further surrounds at least a portion of the third outer edge to further define, between the first and third glass panes, a second sealed interior region having a vacuum pressure of less than one atmosphere, or b) a second edge seal surrounds at least respective portions of the first and third outer edges to further define, between the first and third glass panes, a second sealed interior region having a vacuum pressure of less than one atmosphere.

8. The VIG window of claim 7, wherein the third glass pane comprises an ion-exchanged glass material.

9. The VIG window of claim 7, wherein the first, second and third glass panes each comprise an ion-exchanged glass material.

10. The VIG window of claim 7, wherein the second plurality of glass-bump spacers are formed substantially opposed to respective ones of the first plurality of glass-bump spacers.

11. The VIG window of claim 7, wherein the second plurality of glass-bump spacers are formed offset from the first plurality of glass-bump spacers.

12. The VIG window of claim 7, wherein the first, second and third glass panes have respective thicknesses of less than 1 mm.

13. The VIG window of claim 7, wherein the window is substantially flat.

14. The VIG window of claim 7, wherein the window is shaped.

15. The VIG window of claim 1, further comprising:
a third glass pane spaced apart from and disposed substantially parallel to the first glass pane at a side opposite the second glass pane and at a second distance, the third glass pane having a third body formed from a third glass material and having third opposite surfaces and a third outer edge;
a second plurality of glass-bump spacers integrally formed in one of the third surfaces of the third glass pane and consisting of the third glass material from the third body portion;
a second optical coating formed over both the second glass-bump spacers and the surface in which the second glass-bump spacers are formed, wherein
the third glass pane comprises an ion-exchanged glass material,
the second plurality of coated glass-bump spacers contact the first glass pane so as to maintain said spaced apart second distance, and
either a) the first edge seal further surrounds at least a portion of the third outer edge to further define, between the first and third glass panes, a second sealed interior region having a vacuum pressure of less than one atmosphere, or b) a second edge seal surrounds at least respective portions of the first and third outer edges to further define, between the first and third glass panes, a second sealed interior region having a vacuum pressure of less than one atmosphere.

16. The VIG window of claim 1, further comprising:
a third glass pane spaced apart from and disposed substantially parallel to the second glass pane at a side opposite the first glass pane and at a second distance, the third glass pane having a third body formed from a third glass material and having third opposite surfaces and a third outer edge;
a second plurality of glass-bump spacers integrally formed in one of the third surfaces of the third glass pane and consisting of the third glass material from the third body portion;
a second optical coating formed over both the second glass-bump spacers and the surface in which the second glass-bump spacers are formed, wherein
the first, second the third glass pane comprises an ion-exchanged glass material,
the second plurality of coated glass-bump spacers contact the second glass pane so as to maintain said spaced apart second distance, and
either a) the first edge seal further surrounds at least a portion of the third outer edge to further define, between the first and third glass panes, a second sealed interior region having a vacuum pressure of less than one atmosphere, or b) a second edge seal surrounds at least respective portions of the first and third outer edges to further define, between the first and third glass panes, a second sealed interior region having a vacuum pressure of less than one atmosphere.

17. A vacuum-insulated glass (VIG) window assembly, comprising:
a first glass pane;
a second glass pane spaced apart from and disposed substantially parallel to the first glass pane at a first distance;
a plurality of glass-bump spacers integrally formed in a first surface of the first glass pane, and
a first optical coating formed over both the glass-bump spacers and the first surface in which the first glass-bump spacers are formed, wherein
the first glass pane comprises an ion-exchanged glass material,
the optical coating comprises a polymer layer or a dielectric layer, and
the plurality of coated glass-bump spacers contact the second glass pane so as to maintain said spaced apart first distance.

18. The VIG window of claim 17, wherein the second glass pane comprises an ion-exchanged glass material.

19. The VIG window of claim 1, wherein the glass-bump spacers have a substantially hemispherical shape.

* * * * *